(12) United States Patent
Shi et al.

(10) Patent No.: US 11,241,787 B2
(45) Date of Patent: Feb. 8, 2022

(54) WAIST IMITATING DEVICE OF ROBOTIC RAT BASED ON MULTIPLE-CONNECTING-ROD TRANSMISSION

(71) Applicant: BEIJING INSTITUTE OF TECHNOLOGY, Beijing (CN)

(72) Inventors: Qing Shi, Beijing (CN); Chang Li, Beijing (CN); Mengchao Ma, Beijing (CN); Mingjie Zou, Beijing (CN); Shengjie Wang, Beijing (CN); Qiang Huang, Beijing (CN); Fukuda Toshio, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 46 days.

(21) Appl. No.: 16/770,940

(22) PCT Filed: Apr. 19, 2018

(86) PCT No.: PCT/CN2018/083800
§ 371 (c)(1),
(2) Date: Jun. 8, 2020

(87) PCT Pub. No.: WO2019/127995
PCT Pub. Date: Jul. 4, 2019

(65) Prior Publication Data
US 2021/0187730 A1    Jun. 24, 2021

(30) Foreign Application Priority Data
Dec. 29, 2017 (CN) .......................... 201710903268.X

(51) Int. Cl.
*B25J 9/10* (2006.01)
*B25J 17/00* (2006.01)

(52) U.S. Cl.
CPC ............. *B25J 9/1065* (2013.01); *B25J 17/00* (2013.01)

(58) Field of Classification Search
CPC .......... B25J 9/1065; B25J 17/00; B25J 9/162; G05D 1/08
See application file for complete search history.

(56) References Cited

FOREIGN PATENT DOCUMENTS

CN         107398922 A    * 11/2017

* cited by examiner

Primary Examiner — Randell J Krug
(74) Attorney, Agent, or Firm — Enshan Hong; MagStone Law, LLP

(57) ABSTRACT

A waist imitating device of robotic rat based on multiple-connecting-rod transmission comprises a pitch parallel connecting rod group (8) and a yaw parallel connecting rod group (2). The pitch parallel connecting rod group (8) and the yaw parallel connecting rod group (2) are respectively connected with a front joint and a back joint of a waist of a robotic rat. Under the drive of a first motor (4), crank connecting rods drive the yaw parallel connecting rod group (2) such that left-right yaw motion of the waist of the robotic rat relative to wheels and forelimbs can be achieved. Under the drive of a second motor (14), crank connecting rods drive the pitch parallel connecting rod group (8) such that upper-down pitch motion of the waist of the robotic rat relative to the wheels and the forelimbs can be achieved.

19 Claims, 3 Drawing Sheets

WAIST IMITATING DEVICE OF ROBOTIC RAT BASED ON MULTIPLE-CONNECTING-ROD TRANSMISSION

CROSS REFERENCE TO RELATED APPLICATIONS

This application claims priority to Chinese Patent Application No. 201710903268.X entitled "WAIST MECHANISM DESIGN OF ROBOTIC RAT BASED ON CONNECTING ROD TRANSMISSION", filed before China's National Intellectual Property Administration on Dec. 29, 2017, the entire contents of which are incorporated herein by reference.

TECHNICAL FIELD

The present invention belongs to the technical field of bionic robots, and specifically relates to an imitating device of robotic rat based on multiple-connecting-rod transmission.

BACKGROUND

A bionic robot has a system which imitates the external shape, the motion principle and the behavior way of a creature in nature and can operate with the characteristics of the creature.

In non-patent literature 1 ("Design and Control of a Biomimetic Robotic Rat for Interaction with Laboratory Rats, SHI, Qing and the like, IEEE/ASME Transactions on Mechatronics, 2014.), the author provides a structure design of a biomimetic robotic rat and experimental research. A waist mechanism of the biomimetic robotic rat is formed by four motors, a motor support, differential gearboxes, bearings, fastening screws and the like. The four motors are positioned by the motor support, the output shaft of each motor is fixed to a gear as an input of a differential gearbox, and a front differential gearbox and a back differential gearbox are utilized as the drive of a front joint and a back joint of the biomimetic robotic rat in pitch and yaw directions.

The waist mechanism of the biomimetic robotic rat uses the four motors to drive based on a combination of the differential gearboxes such that the waist mechanism has a redundant degree of freedom and is complex in control. As the output structure of the waist, the differential gearboxes have large weight and size to cause a small motion range of each joint, and the shape of the biomimetic robotic rat cannot be greatly close to the shape of a real rat. Furthermore, the motion of the biomimetic robotic rat has remarkable noises by utilizing the gear drive.

SUMMARY

An objective of the present invention is to provide a novel waist imitating device of a robotic rat to solve problems that a waist mechanism of the robotic rat is complex in control and has redundant degree of freedom as well as large weight and size.

The present invention adopts a technical solution as follows:

A waist imitating device of robotic rat based on multiple-connecting-rod transmission comprises a pitch parallel connecting rod group, a yaw parallel connecting rod group and an output shaft; wherein the pitch parallel connecting rod group and the yaw parallel connecting rod group are respectively connected with a front joint and a back joint of a waist of a robotic rat such that the front joint and the back joint can correlatively conduct upper-down pitch rotation and left-right yaw rotation, and rotation directions are opposite.

Further, the pitch parallel connecting rod group comprises: a pitch sliding connecting rod, a first front connecting rod-sliding connecting rod connecting shaft, a first back connecting rod-sliding connecting rod connecting shaft, a first front connecting rod, a first back connecting rod, a first front crank-connecting rod connecting shaft, a first back crank-connecting rod connecting shaft, a first front crank and a first back crank; the first front crank and the first back crank symmetrically rotate basically about the pitch sliding connecting rod.

Further, the first front connecting rod and the first back connecting rod are respectively fixed to the first front crank-connecting rod connecting shaft and the first back crank-connecting rod connecting shaft; the pitch sliding connecting rod is fixed to the first front connecting rod-sliding connecting rod connecting shaft and the first back connecting rod-sliding connecting rod connecting shaft; the pitch parallel connecting rod group is fixed to a first motor mount and a second motor mount.

Further, the yaw parallel connecting rod group comprises: a yaw sliding connecting rod, a second front connecting rod-sliding connecting rod connecting shaft, a second back connecting rod-sliding connecting rod connecting shaft, a second front connecting rod, a second back connecting rod, a second front crank-connecting rod connecting shaft, a second back crank-connecting rod connecting shaft, a second front crank and a second back crank; the second front crank and the second back crank symmetrically rotate basically about the yaw sliding connecting rod.

Further, the second front connecting rod and the second back connecting rod are respectively fixed to the second front crank-connecting rod connecting shaft and the second back crank-connecting rod connecting shaft; the second front connecting rod and the second back connecting rod are respectively fixed to the second front connecting rod-sliding connecting rod connecting shaft and the second back connecting rod-sliding connecting rod connecting shaft; the yaw parallel connecting rod group is fixed to an upper motor mount.

Further, the waist imitating device of robotic rat based on multiple-connecting-rod transmission further comprises a first motor and a second motor, wherein an output shaft of the first motor is fixed to the pitch parallel connecting rod group through a first crank; an output shaft of the second motor is fixed to the yaw parallel connecting rod group through a second crank; under the drive of a corresponding motor, each crank respectively drives sliding connecting rods of the pitch parallel connecting rod group and the yaw parallel connecting rod group to conduct reciprocative linear sliding;

when the pitch sliding connecting rod of the pitch parallel connecting rod group conducts the reciprocative linear sliding, upper-down pitch motion of the waist of the robotic rat can be achieved; when the yaw sliding connecting rod of the yaw parallel connecting rod group conducts the reciprocative sliding, left-right yaw motion of the waist of the robotic rat can be achieved.

Further, the pitch parallel connecting rod group is fixed to support frames through second flange bearings, and the first flange bearing and the support frame are in clearance fit; the pitch parallel connecting rod group fixedly slides in sliding slots of the first motor mount and the second motor mount through a mini ball bushing, and the mini ball bushing is in clearance fit with the first motor mount and the second motor mount; the first motor mount and the second motor mount are respectively provided with holes; the first motor and the second motor are respectively fixed to the first motor mount and the second motor mount and are respectively in clearance fit with the corresponding holes; the output shaft of the first motor is fixed to the crank connecting rod; the yaw parallel connecting rod group is fixed to transmission shafts; the transmission shafts are fixed to the first motor mount and the second motor mount through first flange bearings; two sliding slots are opened in the first motor mount; the yaw parallel connecting rod group is fixed to and slides in the sliding slots of the first motor mount through self-lubricating bearings; the self-lubricating bearings and the sliding slots of the first motor mount are in clearance fit.

Further, the pitch parallel connecting rod group further comprises: bearings, snap springs and mini ball bushings; the pitch sliding connecting rod fits for the sliding slots of the first motor mount and the second motor mount through the mini ball bushings; the mini ball bushings are in clearance fit with the sliding slots of the motor mounts; the mini ball bushings are fixed between the sliding slots of the first motor mount and the second motor mount and end caps; the mini ball bushings fit for the pitch sliding connecting rod; the holes of the first front connecting rod and the first back connecting rod fit for the mini ball bushing; the first front connecting rod and the first back connecting rod are respectively fixed to the first front crank-connecting rod connecting shaft and the first back crank-connecting rod connecting shaft; the bearings are fixed between shaft shoulders of the crank-connecting rod connecting shafts and bosses of the cranks; the holes of the first front connecting rod and the first back connecting rod respectively fit for the first front crank-connecting rod connecting shaft and the first back crank-connecting rod connecting shaft, end faces are in contact with the bearings, and the bearings are fixed to the first front crank-connecting rod connecting shaft and the first back crank-connecting rod connecting shaft through snap springs.

Further, the yaw parallel connecting rod group further comprises: bearings and snap springs; the yaw sliding connecting rod is fixed to and slides in the sliding slots of the upper motor mount through self-lubricating flange bearings, and the self-lubricating flange bearings are in clearance fit with the sliding slots of the upper motor mount; the bearings are fixed between shaft shoulders of the second front, back connecting rod-sliding connecting rod connecting shafts and bosses of the sliding connecting rods; holes of the second front, back connecting rods fit for the connecting rod-sliding connecting rod connecting shafts, end faces are in contact with the bearings, the bearings are fixed to the second front, back connecting rod-sliding connecting rod connecting shafts through snap springs, and the bearings are fixed between the shaft shoulders of the second front, back crank-connecting rod connecting shafts and bosses of the cranks; the holes of the second front connecting rod and the second back connecting rod respectively fit for the second front, back crank-connecting rod connecting shafts, end faces are in contact with the bearings, and the bearings are fixed to the second front, back crank-connecting rod connecting shafts through snap springs; the second front crank and the second back crank are fixed to the transmission shafts, and the transmission shafts are fixed to the first motor mount and the second motor mount through first flange bearings.

The present invention further provides a robotic rat, comprising wheels and forelimbs and further comprising the waist imitating device of robotic rat based on multiple-connecting-rod transmission according to the above technical solution.

The present invention has the following beneficial effects:

(1) the present invention replaces the original differential gearboxes with the parallel connecting rod mechanisms, which are driven by connecting rods, thereby reducing two motors, reducing the redundant degree of freedom, helping the front joint and the back joint of the waist to be linked, improving its bionic motion capability, and operating more like a real rat;

(2) the present invention reduces the weight and the size of the waist mechanism to ensure the flexibility of the structure of the waist.

Figure 1:
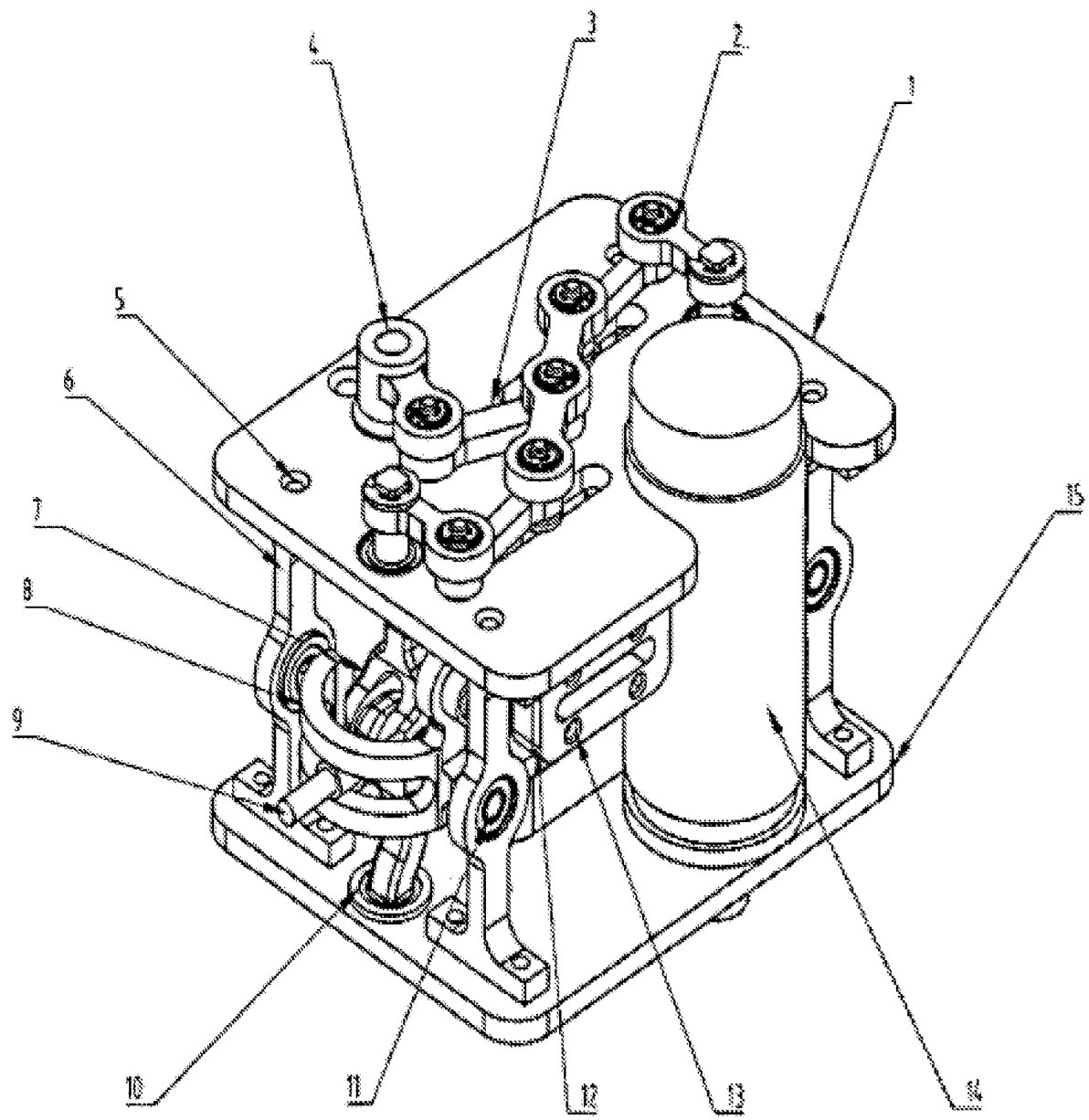
FIG. 1 is a schematic structural diagram of a waist of a robotic rat based on connecting rod transmission of the present invention.

In the drawings: 1—upper motor mount, 2—yaw parallel connecting rod group, 3—crank connecting rod, 4—first motor, 5—first bolt, 6—support frame, 7—transmission shaft, 8—pitch parallel connecting rod group, 9—output shaft, 10—first flange bearing, 11—second flange bearing, 12—end cap, 13—second bolt, 14—second motor, 15—lower motor mount, 81—sliding connecting rod, 82—first mini ball bushing, 83—second mini ball bushing, 84—connecting rod, 85—crank—connecting rod connecting shaft, 86—bearing, 87—first snap spring, 88—crank, 89—bearing, 810—sliding slot, 811—sliding slot, 91—sliding connecting rod, 92—connecting rod—sliding connecting rod connecting shaft, 93—second snap spring, 94—bearing, 95—snap spring, 96—crank, 97—connecting rod, 98—transmission shaft, 99—crank-connecting rod connecting shaft, 910—snap spring, 911—bearing, 912—bearing, 913—sliding slot.

DESCRIPTION OF THE EMBODIMENTS

Referring to FIG. 1, a waist imitating device of robotic rat based on connecting rod transmission comprises an upper motor mount 1, a yaw parallel connecting rod group 2, crank connecting rods 3, a first motor 4, first bolts 5, support frames 6, transmission shafts 7, a pitch parallel connecting rod group 8, an output shaft 9, first flange bearings 10, second flange bearings 11, end caps 12, second bolts 13, motors 14 and a lower motor mount 15. The support frames 6 are connected with the upper motor mount 1 and the lower motor mount 15 through screws. The pitch parallel connecting rod group 8 is fixed to the support frames 6 through the second flange bearings 11, wherein the second flange bearings 11 and the support frames 6 are in clearance fit. The upper motor mount and the lower motor mount have two vertical sliding slots, respectively. The pitch parallel connecting rod group 8 is fixed to the sliding slots of the upper motor mount and the lower motor mount through the ball bushings.

The yaw parallel connecting rod group 2 is fixed to the transmission shafts 7. The transmission shafts 7 are fixed to the upper motor mount 1 and the lower motor mount 15 through the first flange bearings 10. Sliding slots 913 are opened in the upper motor mount. The yaw parallel connecting rod group 2 is fixed to and slides in the sliding slots 913 of the upper motor mount through bearings 912. Two holes are opened in the motor mount, the two motors are respectively in clearance fit with the two holes, and the motors are fixed to the crank connecting rods 3 through D-shaped shafts. Under the drive of the first motor 4, the crank connecting rods drive the yaw parallel connecting rod group. When the sliding connecting rods of the yaw parallel connecting rod group slide, left-right yaw motion of a waist of a robotic rat relative to wheels and forelimbs can be achieved; similarly, upper-down pitch motion of the waist of the robotic rat relative to the wheels and the forelimbs can be achieved.

Figure 2:
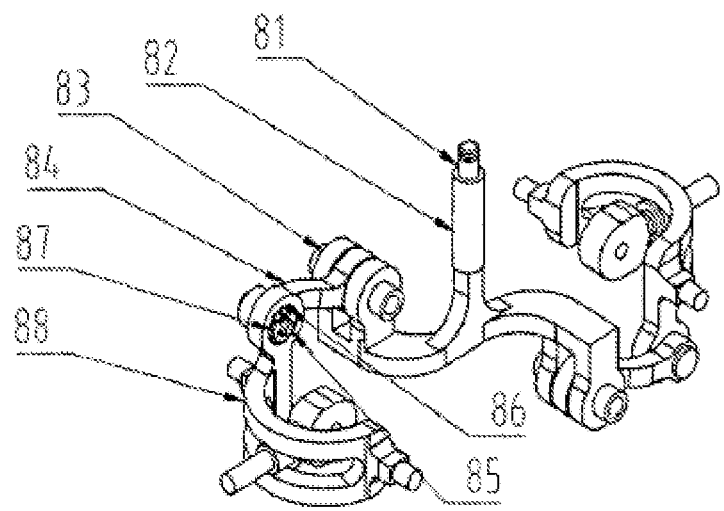
FIG. 2 and FIG. 3 are schematic diagrams of partial structures of a pitch parallel connecting rod group of the present invention.
Figure 3:
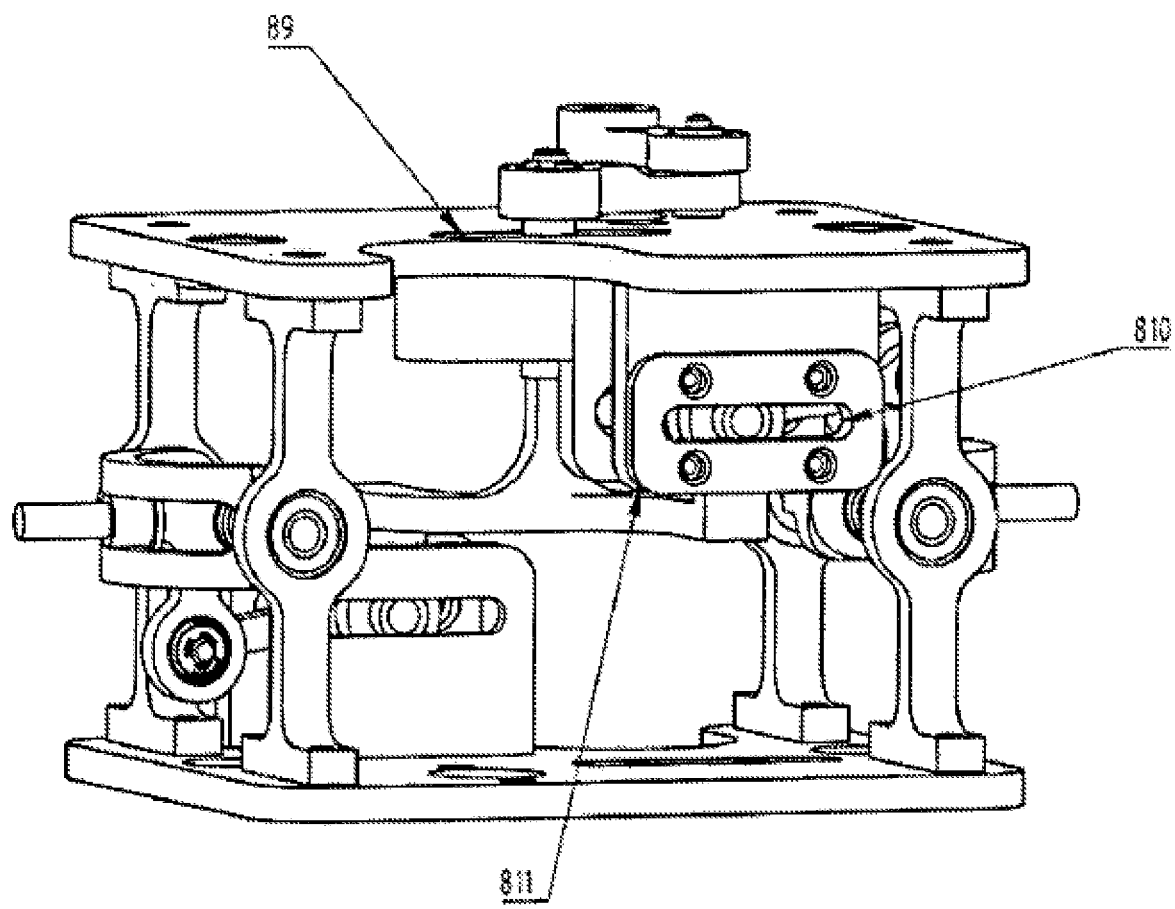

Referring to FIG. 2 and FIG. 3, the pitch parallel connecting rod group 8 comprises: sliding connecting rods 81, mini ball bushings 82, mini ball bushings 83, connecting rods 84, cranks 85, bearings 86, crank-connecting rod connecting shafts 87, bearings 88, snap springs 89, sliding slots 810, crank-connecting rods 811, and sliding slots 812. The sliding connecting rods 81 fit for the crank-connecting rods 811 through the bearings and are fixed by the snap springs. The sliding connecting rods 81 are fixed to and slide in the sliding slots 810 through the mini ball bushings 82. The mini ball bushings 82 and the sliding slots 810 are in clearance fit. The sliding connecting rods 81 are fixed to and slide in the sliding slots 812 through the mini ball bushings 83. The mini ball bushings 83 and the sliding slots 812 are in clearance fit. The connecting rods 84 and the mini ball bushings 83 are fixed between the sliding connecting rods 81. The connecting rods 84 and the crank-connecting rod connecting shafts 87 are fixed. The bearings 88 are fixed between shaft shoulders of the crank-connecting rod connecting shafts and bosses of the cranks. The holes of the connecting rods 84 fit for the crank-connecting rod connecting shafts 87, end faces are in contact with the bearings, and the bearings 86 are fixed to the crank-connecting rod connecting shafts 85 through the first snap springs 87.

Figure 4:
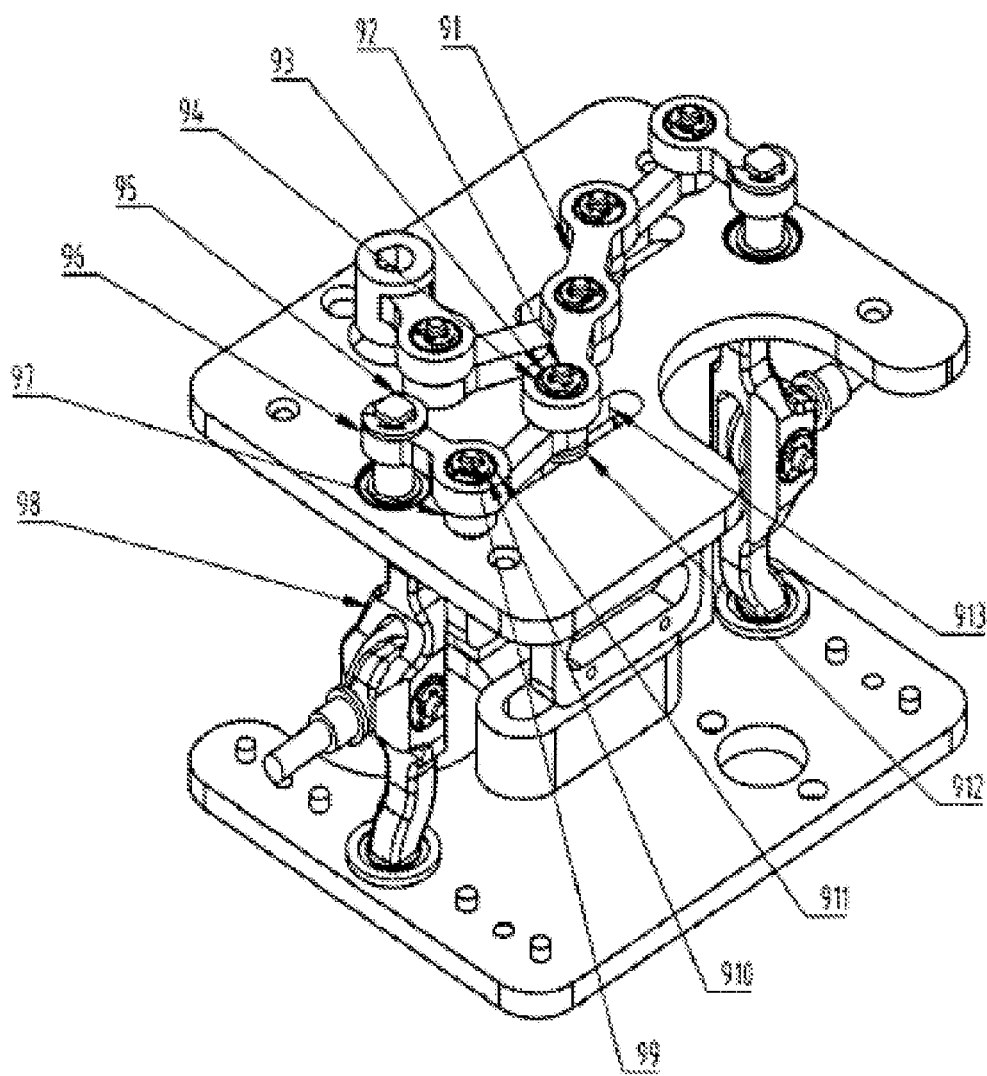
FIG. 4 is a schematic diagram of a partial structure of a yaw parallel connecting rod group of the present invention.

Referring to FIG. 4, the yaw parallel connecting rod group comprises: sliding connecting rods 91, connecting rod-sliding connecting rod connecting shafts 92, snap springs 93, bearing 94, snap springs 95, cranks 96, connecting rods 97, transmission shafts 98, crank-connecting rod connecting shafts 99, snap springs 910, bearings 911, bearings 912, and sliding slots 913. The sliding connecting rods 91 fit for the crank-connecting rods 92 through the bearings, and are fixed by the snap springs. The bearings 94 are fixed between the snap springs 93 and bosses of the sliding connecting rods. Holes of the connecting rods 93 fit form the connecting rod-sliding connecting rod connecting shafts 92, and end faces are in contact with the bearings 94. The connecting rod-sliding connecting rod connecting shafts 92 are fixed to and slide in the sliding slots 914 through the bearings 913. The bearings 912 are fixed between the snap springs 911 and bosses of the cranks 97. The holes of the connecting rods 98 fit for the crank-connecting rod connecting shafts 910, end faces are in contact with the bearings 91, and the cranks 97 are fixed to the transmission shafts 99.

What is claimed is:

1. A waist imitating device of a robotic rat based on a multiple-connecting-rod transmission, comprising:
   a pitch parallel connecting rod group;
   a yaw parallel connecting rod group; and
   an output shaft;
   wherein the pitch parallel connecting rod group and the yaw parallel connecting rod group are respectively connected with a front joint and a back joint of a waist of a robotic rat such that the front joint and the back joint can correlatively perform upper-down pitch rotation and left-right yaw rotation, and the rotation directions are opposite.

2. The waist imitating device of a robotic rat based on a multiple-connecting-rod transmission according to claim 1, wherein the pitch parallel connecting rod group comprises:
   a pitch sliding connecting rod;
   a first front connecting rod-sliding connecting rod connecting shaft;
   a first back connecting rod-sliding connecting rod connecting shaft;
   a first front connecting rod;
   a first back connecting rod;
   a first front crank-connecting rod connecting shaft;
   a first back crank-connecting rod connecting shaft;
   a first front crank; and
   a first back crank;
   wherein the first front crank and the first back crank symmetrically rotate basically about the pitch sliding connecting rod.

3. The waist imitating device of a robotic rat based on a multiple-connecting-rod transmission according to claim 2, wherein the first front connecting rod and the first back connecting rod are respectively fixed to the first front crank-connecting rod connecting shaft and the first back crank-connecting rod connecting shaft;
   the pitch sliding connecting rod is fixed to the first front connecting rod-sliding connecting rod connecting shaft and the first back connecting rod-sliding connecting rod connecting shaft; and
   the pitch parallel connecting rod group is fixed to a first motor mount and a second motor mount.

4. The waist imitating device of a robotic rat based on a multiple-connecting-rod transmission according to claim 2, wherein the yaw parallel connecting rod group comprises:
   a yaw sliding connecting rod;
   a second front connecting rod-sliding connecting rod connecting shaft;
   a second back connecting rod-sliding connecting rod connecting shaft;
   a second front connecting rod;
   a second back connecting rod;
   a second front crank-connecting rod connecting shaft;
   a second back crank-connecting rod connecting shaft;
   a second front crank; and
   a second back crank;
   wherein the second front crank and the second back crank symmetrically rotate basically about the yaw sliding connecting rod.

5. The waist imitating device of a robotic rat based on a multiple-connecting-rod transmission according to claim 4, wherein the second front connecting rod and the second back connecting rod are respectively fixed to the second front crank-connecting rod connecting shaft and the second back crank-connecting rod connecting shaft;
   the second front connecting rod and the second back connecting rod are respectively fixed to the second front connecting rod-sliding connecting rod connecting shaft and the second back connecting rod-sliding connecting rod connecting shaft; and
   the yaw parallel connecting rod group is fixed to an upper motor mount.

6. The waist imitating device of a robotic rat based on a multiple-connecting-rod transmission according to claim 5, further comprising:
a first motor; and
a second motor;
wherein an output shaft of the first motor is fixed to the pitch parallel connecting rod group through a first crank;
an output shaft of the second motor is fixed to the yaw parallel connecting rod group through a second crank;
under the drive of a corresponding motor, each crank respectively drives sliding connecting rods of the pitch parallel connecting rod group and the yaw parallel connecting rod group to conduct reciprocative linear sliding;
when the pitch sliding connecting rod of the pitch parallel connecting rod group conducts the reciprocative linear sliding, upper-down pitch motion of the waist of the robotic rat can be achieved; and
when the yaw sliding connecting rod of the yaw parallel connecting rod group conducts the reciprocative sliding, left-right yaw motion of the waist of the robotic rat can be achieved.

7. The waist imitating device of a robotic rat based on a multiple-connecting-rod transmission according to claim 6,
wherein the pitch parallel connecting rod group is fixed to support frames through first flange bearings, and the first flange bearing and the support frame are in clearance fit;
the pitch parallel connecting rod group fixedly slides in sliding slots of the first motor mount and the second motor mount through a mini ball bushing, and the mini ball bushing is in clearance fit with the first motor mount and the second motor mount;
the first motor mount and the second motor mount are respectively provided with holes;
the first motor and the second motor are respectively fixed to the first motor mount and the second motor mount and are respectively in clearance fit with the corresponding holes;
the output shaft of the first motor is fixed to the crank connecting rod;
the yaw parallel connecting rod group is fixed to transmission shafts;
the transmission shafts are fixed to the first motor mount and the second motor mount through second flange bearings;
two sliding slots are opened in the first motor mount;
the yaw parallel connecting rod group is fixed to and slides in the sliding slots of the first motor mount through self-lubricating bearings; and
the self-lubricating bearings and the sliding slots of the first motor mount are in clearance fit.

8. The waist imitating device of a robotic rat based on a multiple-connecting-rod transmission according to claim 6,
wherein the pitch parallel connecting rod group further comprises:
bearings, snap springs and mini ball bushings;
wherein the pitch sliding connecting rod fits for the sliding slots of the first motor mount and the second motor mount through the mini ball bushings;
the mini ball bushings are in clearance fit with the sliding slots of the motor mounts;
the mini ball bushings are fixed between the sliding slots of the first motor mount and the second motor mount and end caps;
the mini ball bushings fit for the pitch sliding connecting rod;
the holes of the first front connecting rod and the first back connecting rod fit for the mini ball bushing;
the first front connecting rod and the first back connecting rod are respectively fixed to the first front crank-connecting rod connecting shaft and the first back crank-connecting rod connecting shaft;
the bearings are fixed between shaft shoulders of the crank-connecting rod connecting shafts and bosses of the cranks; and
the holes of the first front connecting rod and the first back connecting rod respectively fit for the first front crank-connecting rod connecting shaft and the first back crank-connecting rod connecting shaft, end faces are in contact with the bearings, and the bearings are fixed to the first front crank-connecting rod connecting shaft and the first back crank-connecting rod connecting shaft through snap springs.

9. The waist imitating device of a robotic rat based on a multiple-connecting-rod transmission according to claim 6,
wherein the yaw parallel connecting rod group further comprises:
bearings and snap springs;
the yaw sliding connecting rod is fixed to and slides in the sliding slots of the upper motor mount through self-lubricating flange bearings, and the self-lubricating flange bearings are in clearance fit with the sliding slots of the upper motor mount; the bearings are fixed between shaft shoulders of the second front, back connecting rod-sliding connecting rod connecting shafts and bosses of the sliding connecting rods;
holes of the second front, back connecting rods fit for the connecting rod-sliding connecting rod connecting shafts, end faces are in contact with the bearings, the bearings are fixed to the second front, back connecting rod-sliding connecting rod connecting shafts through snap springs, and the bearings are fixed between the shaft shoulders of the second front, back crank-connecting rod connecting shafts and bosses of the cranks;
the holes of the second front connecting rod and the second back connecting rod respectively fit for the second front, back crank-connecting rod connecting shafts, end faces are in contact with the bearings, and the bearings are fixed to the second front, back crank-connecting rod connecting shafts through snap springs; and
the second front crank and the second back crank are fixed to the transmission shafts, and the transmission shafts are fixed to the first motor mount and the second motor mount through second flange bearings.

10. The waist imitating device of a robotic rat based on a multiple-connecting-rod transmission according to claim 1, further comprising wheels and forelimbs.

11. The waist imitating device of a robotic rat based on a multiple-connecting-rod transmission according to claim 2, further comprising wheels and forelimbs.

12. The waist imitating device of a robotic rat based on a multiple-connecting-rod transmission according to claim 3, further comprising wheels and forelimbs.

13. The waist imitating device of a robotic rat based on a multiple-connecting-rod transmission according to claim 4, further comprising wheels and forelimbs.

14. The waist imitating device of a robotic rat based on a multiple-connecting-rod transmission according to claim 5, further comprising wheels and forelimbs.

15. The waist imitating device of a robotic rat based on a multiple-connecting-rod transmission according to claim 6, further comprising wheels and forelimbs.

16. The waist imitating device of a robotic rat based on a multiple-connecting-rod transmission according to claim 7, further comprising wheels and forelimbs.

17. The waist imitating device of a robotic rat based on a multiple-connecting-rod transmission according to claim 8, further comprising wheels and forelimbs.

18. The waist imitating device of a robotic rat based on a multiple-connecting-rod transmission according to claim 9, further comprising wheels and forelimbs.

19. The waist imitating device of a robotic rat based on a multiple-connecting-rod transmission according to claim 3,
   wherein the yaw parallel connecting rod group comprises:
   a yaw sliding connecting rod;
   a second front connecting rod-sliding connecting rod connecting shaft;
   a second back connecting rod-sliding connecting rod connecting shaft;
   a second front connecting rod;
   a second back connecting rod;
   a second front crank-connecting rod connecting shaft;
   a second back crank-connecting rod connecting shaft;
   a second front crank; and
   a second back crank;
   wherein the second front crank and the second back crank symmetrically rotate about the yaw sliding connecting rod.

* * * * *